United States Patent [19]

Stussi

[11] 4,225,623
[45] Sep. 30, 1980

[54] PREPARATION OF FRUIT-ON-THE-TOP SUNDAE-STYLE YOGURT

[76] Inventor: William E. Stussi, 8508 Roanoke Rd., San Gabriel, Calif. 91775

[21] Appl. No.: 937,596

[22] Filed: Aug. 28, 1978

Related U.S. Application Data

[63] Continuation-in-part of Ser. No. 850,410, Nov. 10, 1977, abandoned.

[51] Int. Cl.³ .............................................. A23C 9/133
[52] U.S. Cl. .................................... 426/42; 426/43; 426/130; 426/274; 426/583; 426/392; 426/394
[58] Field of Search ................ 426/34, 42, 43, 274, 426/583, 289, 293, 302, 130, 392, 394

[56] References Cited

U.S. PATENT DOCUMENTS

| | | | |
|---|---|---|---|
| 3,900,574 | 8/1975 | Warwick | 426/302 X |
| 4,058,630 | 11/1977 | Busnel | 426/43 X |

OTHER PUBLICATIONS

Kosikowski, F., Cheese and Fermented Milk Foods, published by the author, Cornell University, Ithaca, N.Y., 1966, (pp. 58 & 59).

Webb et al., Byproducts from Milk, 2nd ed., The Avi Pub. Co., Inc., Westport, Conn., 1970 (pp. 39 & 40).

*Primary Examiner*—David M. Naff
*Attorney, Agent, or Firm*—Christie, Parker & Hale

[57] ABSTRACT

Containers of sundae-style yogurt having a top layer of fruit preserves are prepared by introducing fruit preserves into an inverted container through an opening opposite the container lid to form a layer of fruit preserves on the inside of the lid, introducing inoculated milk into the container above the fruit preserves, sealing the opening, incubating and refrigerating the contents of the sealed container to gel the milk and produce yogurt, and positioning the container in an upright position with the lid on top. Alternatively, an upright container is partially filled with inoculated milk containing a stabilizing gum, the milk is gelled to produce yogurt and a layer of fruit preserves is introduced into the container to cover the top surface of the yogurt. Intermingling of fruit preserves with the milk or yogurt can be inhibited by providing an edible barrier at the interface between the fruit preserves and the milk or yogurt.

29 Claims, 6 Drawing Figures

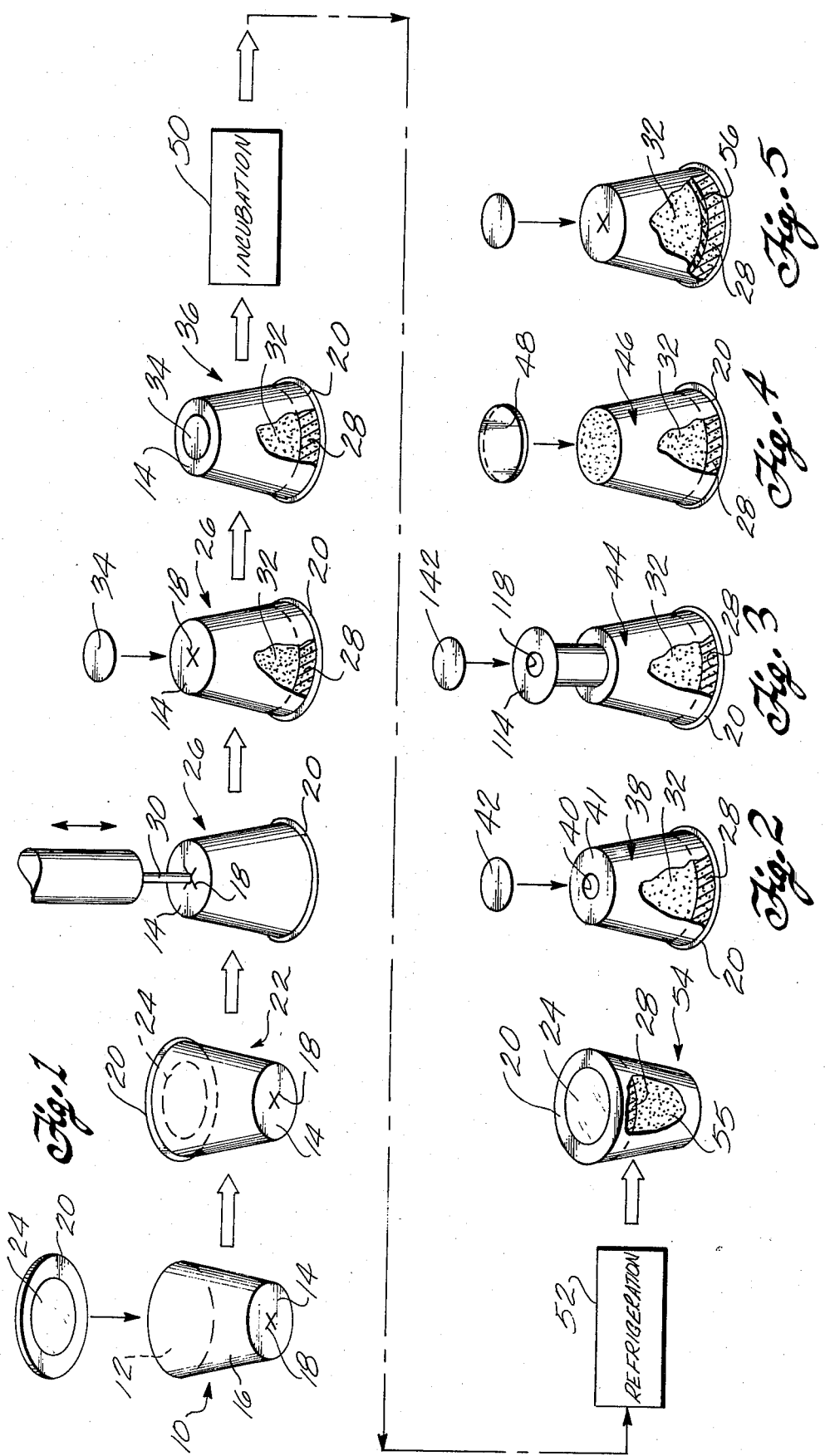

PREPARATION OF FRUIT-ON-THE-TOP SUNDAE-STYLE YOGURT

CROSS-REFERENCE TO RELATED APPLICATION

This is a continuation-in-part of application Ser. No. 850,410, filed Nov. 10, 1977; now abandoned.

BACKGROUND

This invention relates to commercial methods for adding fruit or similar flavors to yogurt, and more particularly, to techniques for filling containers with "sundae-style" yogurt, in which a top layer of fruit preserves overlies yogurt in the bottom of a container, and in which the fruit preserves are immediately inside a lid which closes the top of the container.

Yogurt is a very nutritious dairy product which generally contains cultures of two bacteria (*Lactobacillus bulgaricus* and *Streptococcus themophilus*) that aid in the digestive process. In addition to the basic nutritional value of plain yogurt, a vast number of consumers will only eat yogurt that is fruit flavored, rather than plain yogurt.

At the present time, fruit flavored yogurt is commonly sold in several styles, including a "fruit-on-the-bottom" style in which a layer of fruit preserves is on the bottom of the container and the yogurt fills the rest of the container, or Swiss style yogurt in which fruit preserves are folded into pre-set, stabilized batch-processed yogurt.

The usual procedure for producing fruit-on-the-bottom yogurt is to initially inject, under pressure, approximately 1½ ounces of fruit preserves onto the bottom of an empty container on a high speed (120 units per minute) filling line. Immediately thereafter, the remainder of the container is filled with a bacteriologically inoculated, gum stabilized liquid milk, after which the filled container is closed with a removable opaque lid. The filled containers are then cased and incubated for a period of 4 to 8 hours so that fermentation of the culture in the liquid milk produces yogurt. The containers of yogurt are then refrigerated to coagulate or solidify the stabilizers in the yogurt, and the containers are finally shipped to retail stores or markets.

A variety of animal and/or vegetable gum stabilizers are commercially added to the inoculated liquid milk solution to provide a commercially desirable increase in the viscosity of the yogurt upon incubation and subsequent refrigeration. Such stabilizers have been used in fruit-on-the-bottom and Swiss style fruit flavored yogurt.

Stabilizers such as modified corn or tapioca starch are also added to the fruit preserve layer to inhibit bacteria in the yogurt from attacking sugars in the fruit preserve layer.

Fruit-on-the-bottom yogurt suffers from a number of disadvantages. There is a major unwillingness on the part of consumers, many of whom are children, to stir up the fruit from the bottom of the container, or to eat only plain yogurt until reaching the fruit preserve layer at the bottom of the container. Further, during storage, there is an essentially unavoidable "wheying out" of the liquid whey fraction of the yogurt, in which some of the whey naturally present in the yogurt separates from the yogurt and seeps to the bottom of the container. In fruit-on-the-bottom yogurt, the whey that seeps into the bottom of the container reduces the effectiveness of the stabilizers in the fruit layer and dilutes the fruit preserves, converting the fruit layer to an unattractive soupy mass, as well as disrupting the natural flavor of the fruit preserves.

Prior to this invention, it was not thought possible to commercially produce a container of sundae-style yogurt in which a top layer of fruit preserves is supported above the yogurt. The inoculated liquid milk fraction, with or without added stabilizers, is a watery solution, even after the incubation step produces yogurt (i.e., prior to refrigeration). The milk or yogurt fraction has a lower specific gravity than the fruit preserves, and therefore the milk or yogurt fraction (prior to refrigeration) will not support a top layer of fruit preserves. The fruit preserves sink to the bottom of the container. Hence, it has become a standard practice in the industry to prepare and market fruit-on-the-bottom yogurt.

SUMMARY OF THE INVENTION

This invention provides a commercial method for preparing and filling containers with sundae-style yogurt in which a top layer of fruit preserves having a specific gravity greater than that of yogurt is self-supported by yogurt in the bottom of the container, and in which the fruit preserves are immediately inside a lid at the top of the container.

According to one method for carrying out the invention, one end of a container has a removable lid, and an opposite end of the container has an opening for providing access to the interior of the closed, empty container. The container is inverted so the lid is at the bottom and the opening is foremost. A fruit fraction is introduced through the opening of the container to form a fruit fraction layer resting on the inside surface of the lid. The remainder of the container is thereafter filled above the fruit fraction layer with an inoculated liquid milk fraction introduced through the opening. The opening is sealed, say by a plug press-fitted into the opening, and the liquid milk is then incubated and subsequently refrigerated in the inverted container so that fermentation produces yogurt. The yogurt has sufficient gel strength to support the more dense fruit fraction layer when the container is positioned in the normal upright position for consumer use.

In an alternative form of the invention, a normally upright container is partially filled with an inoculated liquid milk fraction containing one or more gum stabilizing agents, and a sterile environment is provided so the liquid milk fraction can be incubated and subsequently refrigerated in the container. Fermentation in the presence of the stabilizer produces a "set" yogurt. A fruit fraction layer having a higher specific gravity than the yogurt is then introduced to the container to cover the top surface of the set yogurt, providing a container filled with yogurt self-supporting a top layer of fruit.

According to another embodiment of the invention, an edible barrier film is provided at the interface between the fruit fraction and the inoculated liquid milk or yogurt fraction. The edible barrier inhibits intermingling of the fruit fraction with the milk or yogurt fraction at the interface between them. Preferably, the edible barrier comprises a semi-solid, water-insoluble, oil soluble edible material which preferably remains semi-solid at temperatures above either the temperature of the liquid milk or yogurt fraction during incubation or subsequent refrigeration temperature.

These and other aspects of the invention will be more fully understood by referring to the following detailed description and the accompanying drawings.

DRAWINGS

FIG. 1 is a schematic diagram illustrating a process for filling containers with sundae-style yogurt according to principles of this invention;

FIG. 2 is a schematic perspective view, partly in cross-section and partly broken away, showing a first alternative container which can be used in the process illustrated in FIG. 1;

FIG. 3 is a schematic perspective view, partly in cross-section and partly broken away, showing a second alternative container which can be used in the process illustrated in FIG. 1;

FIG. 4 is a schematic perspective view, partly in cross-section and partly broken away, showing a third alternative container which can be used in the process illustrated in FIG. 1;

FIG. 5 is a schematic perspective view, partly in cross-section and partly broken away, illustrating a means for inhibiting intermingling of a fruit fraction at the interface of a liquid milk or yogurt fraction in the process of FIG. 1.

DETAILED DESCRIPTION

Figure 6:
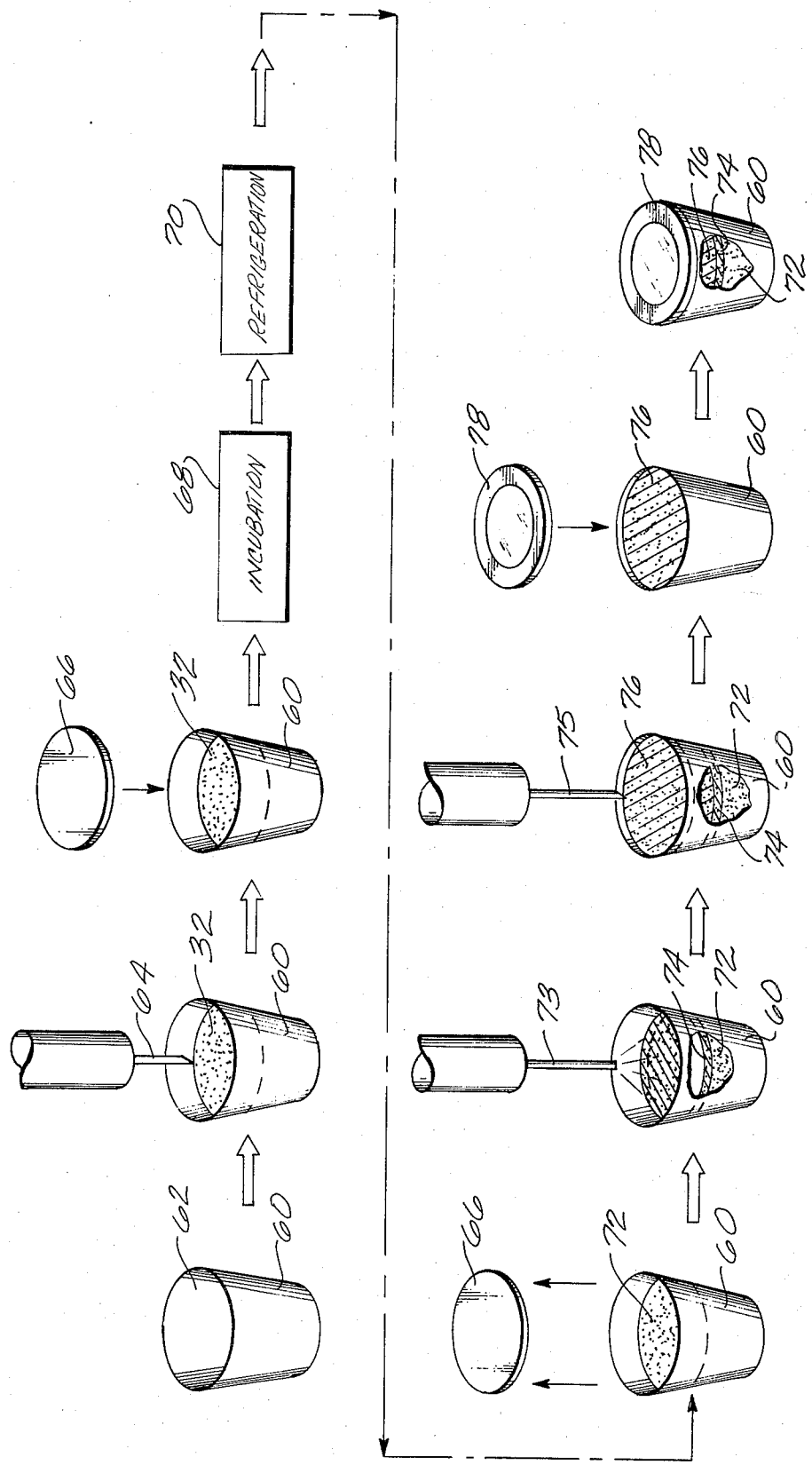
FIG. 6 is a schematic perspective view illustrating an alternative process for filling containers with sundae-style yogurt.

FIG. 1 illustrates a "single-pass" process for filling containers with fruit-on-the-top sundae-style yogurt in which a set yogurt in the bottom of a container has a top layer of fruit preserves immediately inside a lid which closes the top of the container. The process of FIG. 1 is practiced with an empty container 10 having an open top 12, a bottom wall 14, a side wall 16 which tapers wider toward the top of the container, and a circular opening 18 formed in the bottom wall 14 of the container. As an alternative to the circular opening 18, the process of FIG. 1 can be practiced with a container 38 (see FIG. 2) having an X-shaped region 40 formed in a bottom wall 41 of the container. The X-shaped region can be a cut, a perforation, a scoreline, or a weakened area preferably located in the center of the container bottom wall 41.

Referring again to FIG. 1, a removable lid 20 is applied to the empty, upright container to provide a closed, empty container 22. The removable lid 20 is preferably the type having a see-through, transparent region 24 preferably in its center, as shown in FIG. 1, or a totally transparent plastic lid. The lid also preferably has a flat inside surface facing the interior of the closed container. The opening 18 provides a means for access to the interior of the closed, empty container 22. The closed, empty container 22 thus has a removable lid with a flat inside surface at one end of the container and an opening in an opposite end of the container spaced from the removable lid.

The closed, empty container is then inverted by running it through a twisted track or tunnel (not shown) to flip the container 180° so that the inside of the transparent lid 20 provides a horizontal floor of the closed, empty container shown in its inverted position at 26 with the opening 18 being spaced above the lid.

A layer of any of a variety of fruit flavoring material 28, hereafter called a fruit fraction, is placed on the inside surface of the lid of the inverted container. The fruit fraction is deposited in a layer of generally uniform thickness in the bottom of the inverted container. The fruit fraction can be a layer of fruit preserves, pieces of fruit cocktail, or any other desired flavoring material. In one embodiment, pieces of fruit cocktail can be deposited in a uniform layer on the inside surface of the lid, and a liquid gelatin solution in desired flavors then can be poured through the opening to the level of the fruit cocktail pieces and the opening 18 can be plugged, after which the inverted container is refrigerated until the gelatin sets.

The fruit preserves can include stabilizers such as low molecular weight, hydrophillic hydrocolloids (e.g., seaweed extractives such as agar-agar, or some bean exudates, such as locust bean gum), or high molecular weight, hydrophobic hydrocolloids (e.g., modified corn or tapioca starches) to inhibit bacteria in the yogurt from attacking sugars in the fruit preserve layer. The fruit fraction is deposited in the bottom of the inverted container under pressure by a conventional filling nozzle or probe 30. The nozzle is held in a fixed position above the opening 18 in the container, and the fruit preserves are injected as a spray or blast under pressure through the opening in the container bottom wall 14 to deposit the fruit preserves on the inside surface of the lid.

Alternatively, the nozzle can be a conventional air-actuated reciprocal filling nozzle. Such a nozzle can be reciprocally forced down through the X-shaped region 40 of the container shown in FIG. 2 so that the probe momentarily extends into the interior of the container for depositing the fruit fraction on the inside surface of the lid. In the instance where the X-shaped region 40 comprises a previously cut X-shaped opening, the nozzle in its downward movement simply pierces through the X-shaped opening to gain access to the interior of the container for depositing the fruit fraction. Alternatively, the X-shaped region 40 can be a weakened area or a scoreline, and the remote end of the nozzle 30 can be formed as a puncturing device. In its downward movement such a nozzle can puncture an X-shaped opening in the container bottom by punching down on the X-shaped scoreline or weakened area in the container bottom. By forming an X-shaped cut or opening, hinged or flexible right angle portions of the container bottom surround the X-shaped cut or opening. These flexible portions of the container bottom are at least partially closed by the retracting movement of the nozzle 30 away from the opening or cut in the container bottom.

The inverted container 26 then passes to a station for filling the remainder of the container with a bacteriologically inoculated, uncultured, liquid milk fraction 32, preferably with added stabilizers described below. A standard filler nozzle held in a fixed position above the opening 18 is used to inject the liquid milk solution through the opening and into the container interior above the fruit fraction layer. Alternatively, a standard conventional air-actuated reciprocating filling nozzle or probe similar to the nozzle 30 can be used to inject the liquid milk through the opening to penetrate the previously opened X-shaped region in the container bottom to fill the rest of the container with the liquid milk fraction.

The liquid milk fraction preferably is in direct contact with the layer of fruit preserves when the milk fraction fills the container. The liquid milk fraction normally occupies about 80% of the volume of the container, with the balance being the fruit fraction. The layer of fruit preserves remains essentially uniform in thickness while supporting the weight of liquid milk fraction above it. The container can be shaped so that the weight of the liquid milk above the fruit preserve does not disrupt the uniformity of the fruit preserve layer.

Subsequent to filling the inverted container with the fruit fraction 28 and the liquid milk fraction 32, the individual containers continue along a conveyor to a station for automatically inserting a plug 34 in the upwardly facing opening 18 in the container bottom for sealing the opening. Preferably, the plug 34 has a cylindrical body which is slightly oversized to make a tight friction fit in the container opening 18. The plug has an outer flange or lip which overlies the upwardly facing exterior surface of the container bottom wall 14 after the body of the plug is inserted in the opening 18. The overlying flange and oversized body of the plug cooperate to inhibit leakage through the opening when the container is later positioned in its normal upright position. Alternatively, a food grade permanent adhesive-backed, pressure-sensitive label or seal 42 (see FIG. 2) can be adhesively secured or bonded to the container bottom to seal either the opening 18 or the X-shaped region 40. The plug 34 or the seal 42 seals in the contents of the container throughout the remaining processing steps, as well as during shipping, distribution, and consumer use. Such a sealed container is shown in its inverted position at 36.

FIG. 3 illustrates a second alternative container 44 which comprises a hollow stemmed, goblet-shaped plastic cup. In this instance, a bottom flange 114 of the cup has a circular opening 118 which extends through a hollow portion of the stem and into the interior of the container. Reciprocating probes (not shown) can be inserted through the opening 118 to fill the container interior with the fruit fraction 28 and the liquid milk fraction 32. A plug 134 similar to the plug 34 is then inserted in the opening 118 to seal in the contents of the container 44.

The containers shown in FIGS. 1, 2 and 3 facilitate sealing the contents relatively easily and quickly when using the seals 34, 42 and 134, respectively. For example, the circular opening 18 shown in FIG. 1 occupies only a minor portion of the surface area of the container bottom 14. Thus, the remainder of the container bottom provides a rigid base entirely surrounding the opening to which the seal is applied. This facilitates applying the plug 34 in a commercial plugging process, using the rigidity of the plastic container bottom surrounding the opening as a means of support for the flange or lip of the plug. A Resina plugger (Resina Innersealer Model L Series, Resina Automatic Machinery Co., Inc., Brooklyn, N.Y.) can be used for automatically inserting the plug 34. This requires only a relatively short amount of time for the sealing step, and thereby aids in avoiding contamination problems which can arise if the container with the inoculated milk fraction is left open for an appreciable length of time. The portions of the container bottoms 41 and 114 shown in FIGS. 2 and 3 provide similar rigidity surrounding the X-shaped region 40 and the opening 118, respectively, during the sealing process.

FIG. 4 illustrates a further alternative container 46 having a completely open bottom facing upwardly when the container is inverted. The container 46 is filled with the fruit fraction 28 and subsequently the liquid milk fraction 32, after which the upwardly facing opening in the container bottom is sealed by bonding a flat bottom wall or disc 48 to the upwardly facing opening of the container. The container shown in FIG. 4 can be sealed by overlaying the container bottom disc 48 and bonding it, say by heat sealing, to the side wall of the container. As an alternative, the bottom opening can be closed by a cap which makes a friction fit with the side wall of the container.

Following the sealing step, the inverted container is placed in an incubator represented at 50 for about 4 to 8 hours at about 100° F. to 120° F. so that fermentation of the culture in the liquid milk fraction produces yogurt. The yogurt following incubation is still watery and requires refrigeration to solidify the soluble stabilizers in it. The containers with the cultured milk or yogurt are removed from the incubator and placed in a refrigerator represented at 52. The containers remain in their inverted position during refrigeration which produces yogurt 55 capable of self-supporting the layer of fruit preserves 28, even though the fruit preserves have a higher specific gravity than the yogurt. Following refrigeration, the containers are inverted again to their normal upright position shown at 54 to provide a container of sundae-style yogurt in which the yogurt 55 is on the bottom of the container and a layer of fruit preserves 28 is on the top of the yogurt immediately inside the removable transparent lid.

Use of stabilizers in the fruit fraction for inhibiting bacterial attack of the fruit fraction maintains sufficient stratification between the adjacent fruit layer and the yogurt after the container is placed right-side-up that a commercially desirable appearance of the fruit preserves can be maintained beneath the transparent lid. The sundae-style yogurt provided by this invention permits the fruit preserve top layer to be viewed either through a transparent lid at the top of the container, or after the lid is removed. This enhances the attractiveness of the yogurt to the average consumer and can contribute to greater consumer interest, especially when compared with fruit-on-the-bottom yogurt which is commonly sold in entirely opaque containers having a more sterile, i.e., less attractive appearance to the average consumer.

The liquid milk fraction contains one or more gum stabilizing agents in addition to the bacterial inoculum or culture. The gum stabilizing agents cause the milk solution to gel or solidify upon subsequent refrigeration. Such gum stabilizers are known in the art and can include gelatin of animal origin and a number of gums of vegetable origin, such as agar-agar, locust bean gum, modified starches, and the like. A bacteriologically inoculated liquid milk solution without such added stabilizers will coagulate or set and form yogurt upon incubation, but the gel strength or viscosity of the yogurt can be improved by the gum stabilizing agents. The gum stabilizers ensure that the yogurt will have sufficient gel strength, following incubation and subsequent refrigeration, for self-supporting the more dense layer of fruit preserves.

The fruit-on-the-top yogurt provided by this invention eliminates dilution of the fruit preserve layer by the whey that separates from the yogurt upon storage of the yogurt. When the container of fruit-on-the-top yogurt is placed in the right-side-up position, say during storage, any whey that separates from the yogurt seeps toward the bottom of the container away from the fruit preserve layer, which avoids any dilution of the fruit preserve layer and its stabilizing agents.

Any whey that separates to the bottom of the container of fruit-on-the-top yogurt does not cause the yogurt to settle to the bottom of the container under gravity. The gum stabilizers in the yogurt provide sufficient gel strength to resist such settling. Further, the tapered or conical configuration of the container can aid in resisting such settling of the yogurt. As a result, the fruit preserve layer above the yogurt is maintained against the underside of the transparent lid during prolonged storage in the right-side-up position. Any tendency of the fruit preserve layer to separate and produce a "head space" between the fruit and the inside surface of the lid can reduce the visual attractiveness of the product when viewing it through a transparent lid. Since the fruit preserve layer of this invention can be constantly maintained in contact with the inside surface of the transparent lid, the fruit-on-the-top yogurt constantly has an attractive appearance when oriented in the right-side-up position.

At the interface between the fruit fraction 28 and the liquid milk fraction 32 there can be intermingling of the two fractions resulting in osmotic pressure differential dilution of the higher soluble solids of the fruit fraction. Although intermingling at the interface is greatly reduced by added stabilizers in the fruit fraction, intermingling of the two fractions at the interface can be further inhibited by providing an optional semi-solid edible barrier 56 at the interface. The edible barrier preferably comprises a water-insoluble material such as a relatively high melting point vegetable oil, such as hydrogenated coconut oil, or hydrogenated animal fat. Preferably, the edible barrier 56 is applied by spraying it in film thickness over the entire surface of the fruit layer in the process of FIG. 1 prior to injecting the liquid milk fraction 32 into the container. The temperature of the liquid milk fraction during filling and incubation is commonly between about 100° F. to 120° F. The melting point temperature of the edible barrier material is higher than the highest temperature of the liquid milk fraction during filling and incubation, preferably above 120° F. Thus, when the barrier solution is sprayed over the the fruit fraction, it immediately solidifies and remains solidified throughout filling of the container, incubation, refrigeration and consumer use. It thereby provides a barrier which maintains separation and prevents any intermingling between the fruit fraction and the liquid milk or yogurt fraction.

The process of FIG. 1 is especially useful because it is a "single-pass" process which can be completed within a fraction of a minute, in which the fruit fraction and liquid milk fraction are added immediately before and after one another so that the milk fraction is incubated while the fruit fraction is present inside the container. This avoids any potential for contamination which can otherwise be present if the container is filled only with the liquid milk fraction and then temporarily sealed and incubated in a sterile environment, after which the container must be withdrawn from the sterile environment for adding the fruit fraction.

FIG. 6 illustrates an alternative "double-pass" process for filling containers with a fruit-on-the-top sundae-style yogurt. According to the process illustrated in FIG. 6, an empty, normally upright container 60 having an open top 62 is partially filled with the stabilized inoculated liquid milk fraction 32 described above. A standard filling nozzle or probe 64 is used to partially fill the container 60 with the liquid milk fraction 32. The top of the container having the liquid milk fraction is then subjected to a sterile environment, say by covering the container with a temporary seal 66. The temporary seal can be an insert of metal, plastic, waxed paper, etc., or a temporary lid, or a piece of plastic film, waxed paper, or metallic film cut from a web, or the sterile environment can be provided by ultraviolet light without a temporary seal, for example. The liquid milk fraction is exposed to the sterile environment by keeping the top of the container covered by the temporary seal 66, for example during the incubation step 68, during which fermentation of the culture in the liquid milk fraction produces yogurt 72. The temporary seal also seals the contents during the subsequent refrigeration step 70 in which the stabilizers in yogurt are solidified. The container is then withdrawn from the sterile environment, say by removing the temporary seal 66 after refrigeration.

An optional semi-solid edible barrier 56 described above can be deposited on the top surface of the set yogurt 72. Preferably, the edible barrier material 74 is applied by a spray head illustrated at 73. The film solidifies owing to its melting point temperature (crystallization point) being a least higher than the temperature of the yogurt during refrigeration, i.e., above 40° F. Preferably, the melting point temperature of the edible barrier is above about 75° F. to ensure that the film will remain semi-solid during consumer use.

The edible barrier can be applied after refrigeration, or it can be applied to the top of the liquid milk fraction before incubation. In the latter instance, the barrier material can have a melting point of say 75° F. and still be applied in liquid form to the top of a liquid milk fraction having a temperature between 110° to 120° F. In this instance, the barrier film remains in liquid form at the top of the milk fraction, owing to the lower specific gravity of the edible barrier material. Following incubation and during subsequent refrigeration, the barrier film will solidify on the top surface of the yogurt since the temperature of the yogurt is lowered below 75° F. during refrigeration. The fruit fraction then can be added to the top of the solidified edible barrier film.

Following refrigeration of the liquid milk fraction, the container then passes to a standard air-actuated, reciprocal-acting filling nozzle or probe 75 for depositing a stabilized fruit fraction layer 76 on the top surface of the edible barrier material. In absence of the barrier film, the fruit fraction can be deposited directly on top of the set yogurt, which has sufficient gel strength, following refrigeration, to support the more dense fruit fraction layer. The cup is then capped with a removable transparent lid 78 similar to the lid 20 shown in FIG. 1, and the container is subsequently cased and shipped for marketing.

EXAMPLE

More than 500 containers of fruit-on-the-top yogurt were produced according to the following procedure, wherein the steps for preparing one container of fruit-on-the-top yogurt will be described. A one-inch circular hole was formed in the bottom of a standard 8-ounce conical-shaped plastic cup. The cup was placed in a normal upright position and fed into an automated capper which impressed a removable flat see-through lid over the top of the container. The capped, empty container was then inverted by hand and placed on a conventional dairy conveyor belt for feeding the container to a Bock 300 (Bock-Haskon, Inc., St. Paul, Minn. filler/depositor. 1½ ounces of fruit preserves were injected by the depositor through the hole in the upwardly facing bottom wall of the inverted container. The preserves were injected by a fixed (non-retractable) depositor nozzle head about ¼-inch above the hole in the container bottom. Conveyor and depositor speed was 120 containers per minute and several different types of fruit preservers were injected into the containers. The injected fruit preserves typically covered about ⅔ the area of the inside surface of the lid, and after injection, the container was shaken by hand to uniformly distribute the preserves over the entire surface area of the lid. A conventional merry-go-round Federal Filler was used to fill the remainder of the container with a stabilized, bacteriologically inoculated liquid milk solution. The gum stabilizer used in the liquid milk solution was agar-agar in the amount of about 0.5% of the liquid milk fraction, by weight. Filling speed was 120 cups per minute. After the container was filled, the bottom of the container was hand plugged with a 1.2-inch O.D. plastic plug (identical to plug 34 shown in FIG. 1) which made a tight friction fit inside the hole in the container bottom. The plugged container was left in the inverted position and placed in incubation for 5 hours so that fermentation of the culture in the milk fraction produced yogurt. The inverted container was then refrigerated overnight at about 40° F. to solidify the stabilizer and complete coagulation of the yogurt. Approximately 90% of the solidification of the yogurt was contributed by the agar-agar stabilizer, and the remaining approximately 10% was contributed by natural gelatinization provided by the fermentation. The container was removed from the refrigerator and inverted to the normal upright position. The fruit preserve layer remained as a separate, discrete layer, self-supported by the set yogurt, with essentially no intermingling with the yogurt, and the fruit preserves remained in contact with the inside surface of the transparent lid for a prolonged time period of eight weeks and more.

Thus, the invention provides techniques for filling containers with a fruit-on-the-top sundae-style yogurt in which the yogurt and fruit fractions can be deposited in containers quickly and easily in a commercial production line process under conditions which can avoid contamination problems, while producing an end-product in which the fruit fraction remains separated or in a discrete layer supported by the gel strength of the set yogurt.

What is claimed is:

1. A process for filling containers with fruit-on-the-top sundae-style yogurt comprising the steps of:
    providing a container having a removable lid which closes one end of the container and having an opening at an opposite end of the container for providing access to the interior of the container, the container being inverted so the lid is positioned at the bottom of the container and the opening is foremost;
    introducing a fruit fraction through the opening and into the interior of the inverted container to form a fruit fraction layer supported on the inside surface of the lid;
    introducing a bacteriologically inoculated liquid milk fraction through the opening of the inverted container into the interior of the container above the fruit fraction layer;
    sealing the opening of the container;
    incubating and subsequently refrigerating the contents of the sealed inverted container so that fermentation of the milk fraction produces yogurt having sufficient gel strength that, upon subsequently positioning the container in an upright position with the lid foremost, the yogurt in the bottom of the container self-supports the first fraction layer about it; and positioning the container in an upright position with the lid foremost after the refrigerating step to provide a container of fruit-on-the-top sundae-style yogurt wherein the yogurt self-supports a top fruit fraction layer that is immediately beneath the removable lid of the container;

2. The process according to claim 1 in which the specific gravity of the fruit fraction is greater than the specific gravity of the liquid milk fraction.

3. The process according to claim 2 in which the liquid milk fraction contains a gum stabilizing agent for enhancing solidification of the yogurt during the refrigeration step.

4. The process according to claim 3 in which the fruit fraction includes a stabilizing agent for inhibiting bacterial attack of the fruit fraction by the liquid milk fraction.

5. The process according to claim 4 which the liquid milk fraction is in direct contact with the fruit fraction layer.

6. The process according to claim 1 in which the container tapers wider from the container bottom toward the lid.

7. The process according to claim 6 in which the lid is transparent.

8. The process according to claim 1 in which the opening comprises a weakened area in a bottom wall of the container opposite the lid; and including the step of forcing a depositor nozzle through the weakened area to introduce the fruit fraction and the inoculated liquid milk fraction to the interior of the container.

9. The process according to claim 1 including introducing the fruit fraction and the inoculated liquid milk fraction through an opening in the container opposite the lid, followed by sealing the opening by securing a container bottom wall to the top of the container side wall when the container is in the inverted position.

10. The process according to claim 1 including sealing the opening with a food-grade adhesive seal secured to a portion of a container bottom wall surrounding the opening.

11. The process according to claim 1 including sealing the opening by inserting a plug into the opening.

12. The process according to claim 11 in which the plug has a body which makes a tight friction fit in the opening and an outer lip surrounding the body and overlying a bottom wall of the container around the opening.

13. The process according to claim 1 including introducing an edible barrier material to the interior of the container above the fruit fraction prior to introducing the inoculated liquid milk fraction for forming an edible barrier film for inhibiting intermingling of the fruit fraction and the liquid milk fraction at the interface between them.

14. The process according to claim 13 in which the edible barrier material comprises a water insoluble material having a melting point temperature higher than the temperature of the incubation temperature of the inoculated liquid milk fraction.

15. The process according to claim 14 in which the edible barrier material is selected from the group consisting of hydrogenated animal fats and hydrogenated vegetable oils.

16. The process according to claim 1 including sealing the opening by heat sealing a container wall section to the portion of the container that surrounds the opening.

17. The process according to claim 1 including sealing the opening by bonding a container wall section to the portion of the container that surrounds the opening.

18. A process for filling containers with fruit-on-the-top sundae-style yogurt comprising the steps of:
   introducing into a container a bacteriologically inoculated liquid milk fraction containing a gum stabilizing agent;
   placing the container having the inoculated liquid milk fraction in a sterile environment;
   incubating and subsequently refrigerating the liquid milk fraction in the sterile environment so that fermentation of the milk fraction produces yogurt and refrigeration solidifies the gum stabilizer in the yogurt;
   introducing a fruit fraction layer into the container to cover a top surface of the solidified yogurt, wherein the fruit fraction has a greater specific gravity than the liquid milk fraction, the solidified yogurt having sufficient gel strength to self-support the fruit fraction layer;
   forming an edible barrier on the top surface of the yogurt before the fruit fraction is introduced for inhibiting intermingling of the fruit fraction and the yogurt at the interface between them, the edible barrier being selected from the group consisting of hydrogenated animal fats and hydrogenated vegetable oils; and
   applying a removable lid to the top of the container to provide yogurt with a fruit fraction topping immediately beneath the removable lid.

19. The process according to claim 18 in which the fruit fraction includes a stabilizing agent for inhibiting bacterial attack of the fruit fraction by the liquid milk fraction.

20. The process according to claim 18 in which the edible barrier has a melting point temperature higher than the refrigeration temperature of the yogurt.

21. A process for filling container with fruit-on-the-top sundae-style yogurt comprising the steps of:
   providing a container having a removable lid which closes one end of the container and having an opening at an opposite end of the container for providing access to the interior of the container, the container being inverted so the lid is positioned at the bottom of the container and the opening is foremost;
   introducing a fruit fraction through the opening and into the interior of the inverted container to form a fruit fraction layer supported on the inside surface of the lid;
   introducing through the opening of the inverted container and into direct contact with the fruit fraction a bacteriologically inoculated liquid milk fraction containing a gum stabilizing agent for filling the interior of the container above the fruit fraction layer, the specific gravity of the fruit fraction being greater than the specific gravity of the liquid milk fraction;
   sealing the opening of the container;
   incubating and refrigerating the contents of the sealed, inverted container so that fermentation of the milk fraction produces yogurt; and
   positioning the container in an upright position with the lid foremost after the refrigerating step, the yogurt having sufficient gel strength following refrigeration to self-support the fruit fraction layer above it when the container is in the upright position, to provide a container of fruit-on-the-top sundae-style yogurt wherein the yogurt self-supports a top fruit fraction layer that is immediately beneath the removable lid of the container.

22. The process according to claim 21 including sealing the opening with a food-grade adhesive seal secured to a portion of the container bottom wall around the opening.

23. The process according to claim 21 including sealing the opening by inserting a plug into the opening.

24. The process according to claim 21 including introducing the fruit fraction and the inoculated liquid milk fraction through an opening in the container opposite the lid, followed by sealing the opening by securing a container bottom wall to the top of the container side wall when the container is in the inverted position.

25. The process according to claim 21 including sealing the opening by heat sealing a container wall section to the portion of the container that surrounds the opening.

26. The process according to claim 21 including sealing the opening by bonding a container wall section to the portion of the container that surrounds the opening.

27. A container of fruit-on-the-top sundae-style yogurt comprising:
   a container having a removable lid;
   yogurt in a gelled condition in a lower portion of the container;
   a fruit fraction layer in the upper portion of the container immediately inside the removable lid and overlying the yogurt, the fruit fraction having a higher specific gravity than the yogurt, the yogurt having sufficient gel strength to support the fruit fraction layer; and
   an edible barrier film at the interface between the yogurt and the fruit fraction for inhibiting intermingling of the fruit fraction and the yogurt at the interface, the edible barrier being selected from the group consisting of hydrogenated animal fats and hydrogenated vegetable oils.

28. A container of fruit-on-the-top sundae-style yogurt according to claim 27 in which the melting point temperature of the edible barrier is such that it remains solidified below about 75° F.

29. A container of fruit-on-the-top sundae-style yogurt according to claim 27 in which the melting point temperature of the edible barrier is about 120° F.

* * * * *